Nov. 10, 1931. H. W. TOWNSEND 1,830,862
HANDLE ASSEMBLY
Filed Oct. 13, 1930
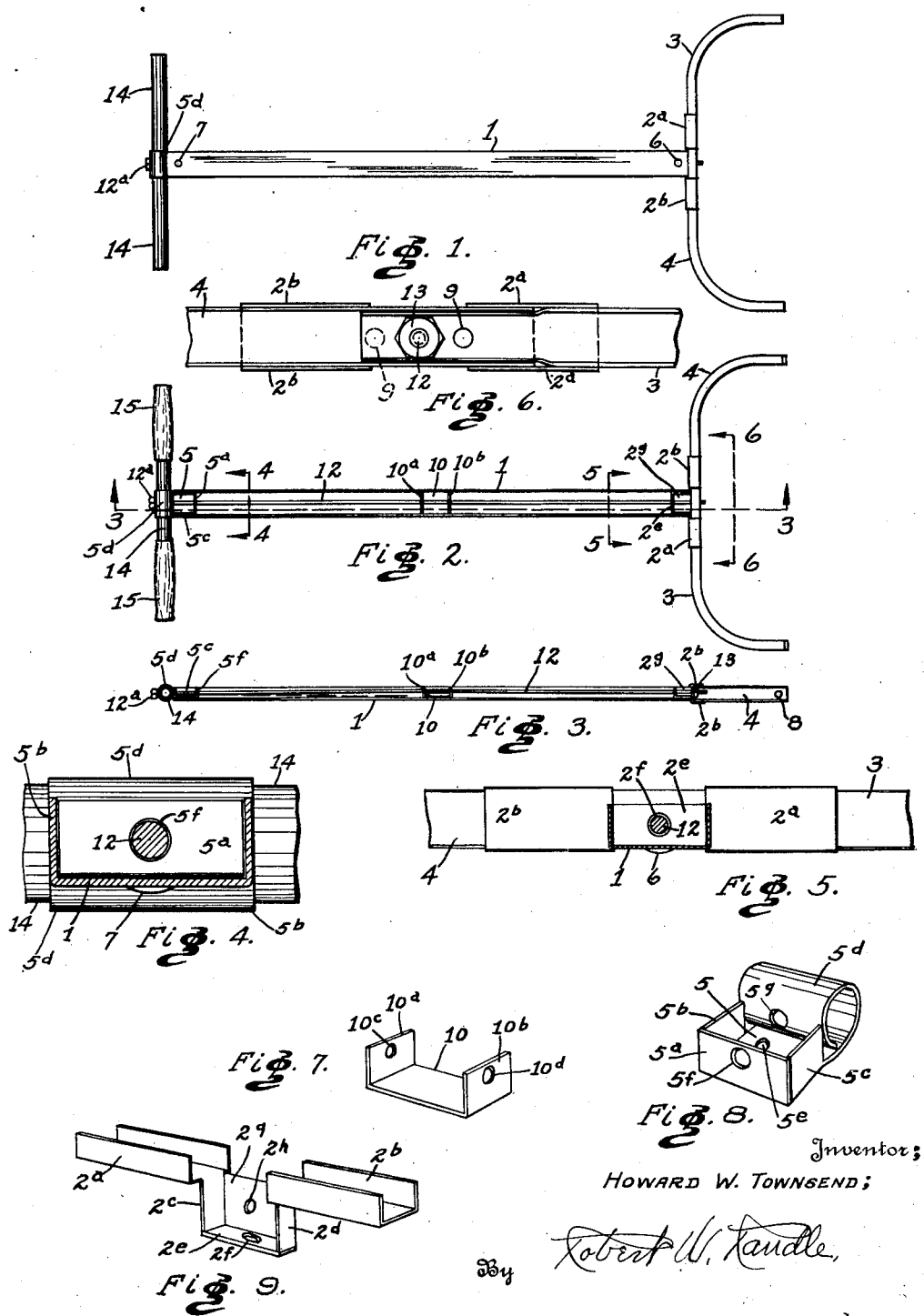
Inventor;
HOWARD W. TOWNSEND;

Patented Nov. 10, 1931

1,830,862

UNITED STATES PATENT OFFICE

HOWARD W. TOWNSEND, OF RICHMOND, INDIANA

HANDLE ASSEMBLY

Application filed October 13, 1930. Serial No. 488,257.

Broadly stated, my object is to provide a handle assembly which is strong and durable in construction, attractive in appearance, comparatively light in weight, which is practically indestructible, affording a high degree of efficiency in operation, and which can be manufactured, sold, and installed at a comparatively low price.

More specifically stated, my object is to provide a handle intended more especially for lawn mowers or the like, the same being formed entirely of sheet-metal and so constructed that it is adjustable to lawn mowers of various widths, and also having means whereby it may be easily attached in operative position and whereby the several parts may be rigidly secured together under tension, yet permitting it to have the proper amount of resiliency, such as to completely absorb or at least minimize the vibration and twisting caused by the lawn mower when operated over rough and uneven ground, whereby the labor of the operator and the vibrations usually transmitted to one's body and limbs will be practically nil.

Another specific object is to provide a trussed handle by which the body or stem of the handle may be formed of comparatively light sheet metal, yet having means for making it self-supporting and without liability of undue bending.

Other objects and particular advantages of this invention will be manifest in the course of the following description, and that which is new will be correlated in the appended claims.

The preferred means for carrying out the principles of my invention in a practical and mechanically efficient manner, is shown in the accompanying drawings, in which—

Figure 1 is a top plan view of my complete handle assembly.

Figure 2 is a bottom or underside plan view of the same.

Figure 3 is a longitudinal section of the same, as taken on the line 3—3 of Fig. 2.

Figure 4 is a cross section, as taken on the line 4—4 of Fig. 2, and showing certain parts therebeyond.

Figure 5 is a cross section, as taken on the line 5—5 of Fig. 2, and showing the parts therebeyond.

Figure 6 is a detail view of the inner or lower end of the central portion of the assembly, as taken from the line 6—6 of Fig. 2. Figure 7 is a perspective view of the central supporting member of my assembly. Figure 8 is a perspective view of the upper supporting member of the assembly. And Figure 9 is a perspective view of the lower supporting member of the assembly.

Similar indices designate like parts throughout the several views.

In order that the construction, the arrangement, and the several advantages of my invention may be more fully understood and appreciated, I will now take up a detailed description thereof, in which I will set forth the same as fully and as comprehensively as I may. Referring now to the drawings in detail: The body portion of my handle assembly comprises a channeled member 1, formed of sheet metal providing a central portion and the two side portions which are integral therewith and extending at right-angle thereto, and which are parallel with each other, the cross-section thereof being clearly shown in Figs. 4 and 5.

The lower supporting member, shown alone in Fig. 9, consists of two comparatively short channel members 2a and 2b, which are spaced apart but are in longitudinal alinement with each other, and they are integrally, but indirectly, connected by a yoke, which latter comprises the members 2c, 2d and 2e, the latter having an aperture 2f formed through its center. Also a base member 2g connects, on one side, the edges of the members 2c, 2d and 2e, and it has an aperture 2h formed through its center. Said lower supporting member is formed from a single piece of sheet metal cut out flat and then bent into the shape as shown in Fig. 9. The yoke portion of said lower supporting member is adapted to fit snugly in the channel at the lower end of the member 1, where it is rigidly secured by a rivet 6 which is inserted through the aperture 2f and a corresponding aperture therefor formed through the member 1.

Numerals 3 and 4 denote curved arms, which are also formed channeled in cross section, their horizontal portions being adapted to be nested together, that is they overlap each other at their inner portions; to accomplish which the inner end portion of the arm 3 is slightly smaller, laterally, than the corresponding portion of the arm 4, as shown in Fig. 6. Both of the arms, 3 and 4, are slightly smaller in cross section than are the channeled members 2a and 2b, whereby they will fit snugly therein, as shown in Fig. 6. The outer end portions of the arms 3 and 4 have apertures 8 therethrough as shown in Fig. 3, whereby they may be pivotally mounted to a lawn mower or other device. The overlapping portions of said arms 3 and 4 have apertures 9 formed therethrough, each aperture 9 of one arm being adapted to register with a like aperture 9 of the other arm, whereby said arms may be adjusted laterally, as will hereinafter be more fully explained.

The upper supporting member, shown alone in Fig. 8, consists of a flat base member 5, having an end member 5a turned at right-angles thereto, and side members 5b and 5c also turned at right-angles to the member 5 and extending at right-angles from the member 5a.

Opposite to the member 5a a tubular member 5d is formed. An aperture 5e is formed through the base 5, an aperture 5f is formed through the member 5a, and corresponding apertures 5g extend entirely through the member 5d, in fact forming two apertures, which are very slightly out of alinement with the aperture 5f, for the purpose hereinafter explained.

Said upper supporting member is adapted to fit snugly in the channel of the upper end of the member 1, where it is rigidly secured by a rivet 7, which is inserted through the aperture 5e and a corresponding aperture formed through the member 1.

The central support, shown in Fig. 7, consists of a base member 10, having end members 10a and 10b extending outward at right angles from the member 10 and formed integral therewith. Apertures 10c and 10d are formed through the respective members 10a and 10b. Said central support is adapted to fit snugly in the channel of the member 1, as shown in Fig. 2.

Numeral 12 denotes a stay rod, which has a head 12a formed on its upper end, and its lower end portion is threaded to receive the nut 13 thereon.

Numeral 14 denotes the handle-bar which fits tightly in the tubular member 5d, where it is centrally located with relation thereto, with an aperture (not shown) formed entirely therethrough, which aperture registers with the aperture 5g.

Numeral 15 denote grip cushions, which are formed of rubber or other suitable material. Said cushions are simply forced over the end portions of the bar 14, as in Fig. 2, or they may be entirely omitted, as in Fig. 1.

In assembling my construction the lower support member is secured to the member 1 by the rivet 6; likewise the upper support is secured to the member 1 by the rivet 7. The central support is inserted in the channel of the member 1, but is not necessarily secured to the member 1.

The next operation is to insert the handle bar 14 into the member 5d. Next the rod 12 is inserted through aperture 5g, and the apertures in the handle bar, and continuing it on through the aperture 5f, forcing it downward until the threaded end thereof is near the central support, at which time it will be inclined to be some distance out of alinement with the apertures 10c and 10d thereby necessitating that it be sprung toward the member 1 in order to enter it in said apertures, through which it is then forced and from which it is then forced downward and then entered in the aperture 2f.

The inner end portions of the arms 3 and 4 are then overlapped with relation to each other, bringing an aperture 9 of each into register with each other, and with the aperture 2f. The end of the rod 12 is then forced into said registering apertures, but before being projected therefrom the nut 13 is placed in position and the threaded end of the rod is then turned, by turning the head 12a, causing it to screw into said nut, the nut being locked from turning by reason of its location in the channel of one of the arms.

Said rod is to be turned by means of a wrench applied to the head 12a, and by this means it is tightened until all of said parts are securely clamped together in the relative positions shown in Fig. 1, thereby completing the assembly.

It should be observed, by reason of the rod 12 being first inserted through the handle-bar and the upper supporting member, that when it is brought down to its final position that it will cause the handle-bar to be more secure and without danger of its becoming loose. Also it should be observed that as the apertures 10c and 10d are farther from the central portion of the member 1, than are the apertures 2f and 5f, that the rod 12 forms a truss, under tension, such as to prevent the handle from bending under unusual strain. Also the entire assembly is such as to accomplish the objects previously enumerated herein.

I desire that it be understood that various changes may be made in the several details herein set forth, in order to accommodate my invention to various purposes, without sacrificing any of the advantages thereof which are new and useful which involve invention.

Having now fully shown and described my invention, what I claim, and desire to secure by Letters Patent of the United States, is—

1. A handle assembly comprising a main channeled member, arms projecting laterally from one end of the main member, a handle-bar projecting laterally from the other end of the main member, and a rod connecting all of said parts and retaining them in clamped relation with each other.

2. A handle assembly comprising a main channeled member, arms projecting laterally from one end of the main member, a handle-bar projecting laterally from the other end of the main member, and a rod extending longitudinally through the main member and securing said arms and the handle bar in operative position and at the same time forming a truss for the main member.

3. A handle comprising a straight portion forming the main member, a supporting member secured in the upper end of the main member and including a tubular portion, a handle-bar extending laterally through the tubular portion, a second supporting member secured to the other end of the main member and having channeled portions extending laterally therefrom, arms lapped together at their inner ends, a rod extending through said handle-bar said first and second supporting members and through said arms and clamping all of the said parts together into a unitary assembly, and means whereby the central portion of said rod is retained out of alinement with the main member to provide trussing means.

4. A handle assembly comprising a sheet-metal channeled main member, a lower supporting member formed of sheet metal and secured in the lower end of said main member and having a pair of comparatively small channeled members extending out laterally therefrom, a pair of channeled arms having their inner end portions nested together and both nested in said small channeled members, an upper support member secured in the upper end of said main member and comprising a tubular portion integral therewith, a handle-bar fitting in said tubular portion, a central supporting member located in the said main member, and a rod extending through said handle-bar, the upper and the lower and the central supporting members and through said arms and adapted to clamp the handle-bar and said arms securely in connection with said main member with said rod under tension and forming a truss for the assembly, substantially as set forth.

5. A handle assembly comprising a main channeled member, a lower supporting member secured to one end of the main member, a pair of comparatively small channeled members extending outwardly opposite to each other from said lower supporting member, an upper supporting member secured to the upper end of the main member, a tubular member integral with the upper support member, a central supporting member located in the channel of the main member, a handle-bar located in said tubular member, a rod extending through the handle bar and the three supporting members, a pair of arms overlapping each other and through which said rod extends, a nut threaded on the lower end of said rod, a head formed on the upper end of said rod, and means whereby the turning of said rod by means attached to said head will tighten said nut against said arms and thereby clamp all of said parts together, substantially as set forth.

In testimony whereof I have hereunto subscribed my name.

HOWARD W. TOWNSEND.